Nov. 4, 1958
D. F. OTHMER
2,859,154
PROCESS FOR CONCENTRATING ACETIC ACID
AND OTHER LOWER FATTY ACIDS USING
ENTRAINERS FOR THE ACIDS
Filed Sept. 26, 1955
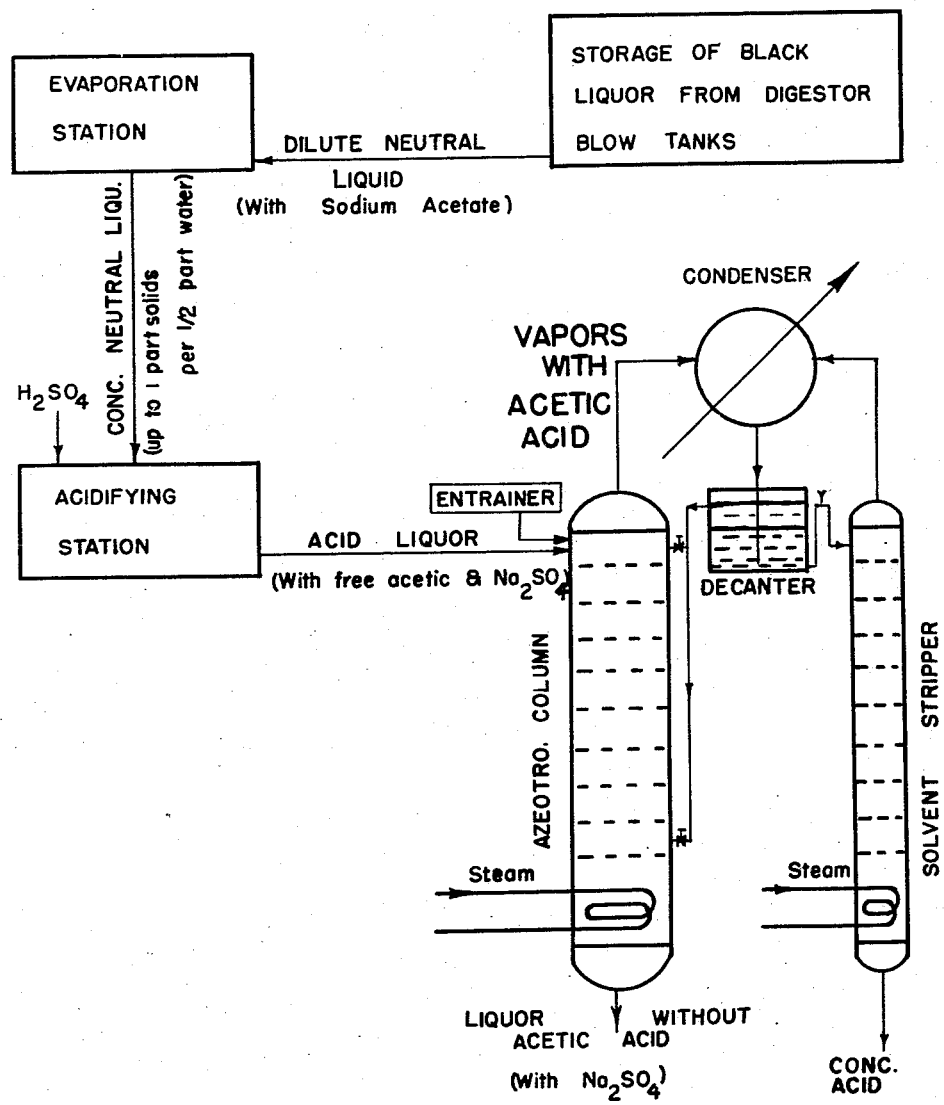
DONALD F. OTHMER
*INVENTOR.*
BY Frank Makara
*Attorney*

United States Patent Office 2,859,154
Patented Nov. 4, 1958

2,859,154

PROCESS FOR CONCENTRATING ACETIC ACID AND OTHER LOWER FATTY ACIDS USING ENTRAINERS FOR THE ACIDS

Donald F. Othmer, Coudersport, Pa.

Application September 26, 1955, Serial No. 536,727

1 Claim. (Cl. 202—42)

This invention relates to a method of obtaining concentrated lower volatile fatty acids from liquors resulting from the treatment of ligno-cellulosic materials such as wood, bagasse, straw, and other vegetative materials, as well as from certain other liquors containing large amounts of salts of either organic or inorganic acids, or of both. The method may also be used for effecting a concentration of aqueous acetic acid containing little if any salts in solution.

In the prior art there have been disclosed many methods of concentrating acetic acid and other simultaneously occurring aliphatic acids from solutions obtained from treating ligno-cellulosic materials which contain the acids in the free form.

In many other operations of the cellulose industries, acetic acid and its mixtures and other aliphatic acids, for example, propionic acid, butyric acid, and particularly formic acid, occurs in the form of its salts of the potassium, sodium, ammonium, magnesium, calcium, or other alkali or alkaline earth cation, which cation has been used in the cooking or other treatment of wood or other cellulosic materials. Usually the amounts of such other salts which are present are sufficient to reduce to a greater or less extent the vapor pressure of water, and thus to cause an elevation of the boiling point. Such liquors may be those which result from the destructive distillation of wood, the pulping of wood to give cellulose by various alkaline, acid, or neutral chemical reagents, the decomposition of wood by alkali fusion (e. g. for the production of oxalates, etc.). In each case, the liquors resulting from such processing contain the various residual products of such treatment. In the destructive distillation of wood, for example, the earlier process was to neutralize the acetic acid with an alkaline material such as lime prior to the recovery of the wood alcohol therefrom.

In the caustic soda treatment or fusion of wood (usually as sawdust) with the consequent formation of sodium oxalate, the caustic soda also forms sodium acetate and sodium formate during the decomposition of the wood.

In the treatment of lignocellulosic materials with the various chemical liquors for producing wood pulps, for example, in, among others, the neutral sulfite semi-chemical process, the kraft or sulfate process, etc. there are produced along with other products, the salts of the lower aliphatic acids, principally the salts of acetic acid and of formic acid corresponding to the respective basic materials used in the cooking liquors. These acid salts appear in the residual "black liquor" resulting from the respective processes.

In various other liquors, acetic acid and its lower boiling homologues may be found dissolved in aqueous solutions of salts of either inorganic or organic acids or both, wherein there is an appreciable boiling point elevation of the solution. The vapor pressure of the acetic acid is not affected to the same degree, because of the relatively lower solubility or affinity of acetic acid for the salts in the solution. While this invention is most beneficial for relatively concentrated aqueous solutions of salts which also contain acetic acid dissolved therein, it is also useful for solutions of acetic acid more dilute as to the salts or other constituents present, or even for those containing very little, if any dissolved solids.

In all of the above procedures, the acetic acid and its lower boiling homologues may be recovered for one or more of the following reasons:

(a) To obtain the acids for their use or sale in other chemical industry;

(b) To remove the acids or their salts so that other products of value in the residual liquors may be obtained in a more or less pure form;

(c) To remove the acids or their salts from the liquors so that the liquors may then be disposed as waste in streams. Either in the free form or in the salt form these acids are a bad constituent of waste liquors which are disposed of by dumping into streams, lakes, etc. as they have a high biological oxygen demand (BOD). (Such high absorption of oxygen in the streams is a detriment to fish and other aquatic life.)

In the prior art there have been described many processes of separating acetic acid from liquors containing the acid as such by the extraction of the liquors with solvents of both higher and lower boiling point. Such solvents for acetic acid may exhibit the characteristic of azeotropic distillation with the water. See U. S. Pat. 2,050,234.

In some cases, as in U. S. Pat 2,157,143, relatively high boiling solvents are used.

Still another process, such as disclosed in U. S. Pat. 2,395,010, employs solvents of an intermediate boiling point in conjunction with an azeotropic distillation with a liquid such as a hydrocarbon or a chlorinated hydrocarbon boiling in the range of 100° to 125° C. and used as an aid in the distillation of the acetic acid overhead from the extraction solvent employed. In this and in other prior art, the extraction stage to obtain the acetic acid in a solvent phase was regarded as necessary before the distillation of the acetic acid could be effected in the presence of this added liquid.

Still other processes have envisaged the recovery of acetic acid from black liquors resulting from pulping processes in which the liquor may be first concentrated by evaporation and the acid then is liberated from its salt by the addition of sulfuric or other similar inorganic acid. In the copending application Ser. No. 533,509, the acetic acid has then been extracted with a solvent having a boiling point higher than that of the acetic acid.

According to this present invention, it has been found to be possible to recover acetic and formic acids, as well as propionic and butyric acids, where present, in liquors containing their salts resulting from wood treating processes or from the liquors containing substantial amounts of salts of other acids after preliminary treatment of these liquors, and then distilling them in the presence of certain other added liquids. The original liquors may or may not be first concentrated, to reduce their water content, depending on their original solids content. These liquors are, however, then treated with a carefully controlled amount of sulfuric acid, muriatic acid, or other strong mineral acid before being distilled in the presence of the other added liquid.

The liquids which are to be added are selected for their ability to form an azeotropic or constant boiling mixture with acetic acid, which mixture boils at a temperature below the boiling point of acetic acid, 118.5° C. Numerous liquids are known which do form azeotropic mixtures with acetic acid. The common ones are either aliphatic or aromatic hydrocarbons, or aliphatic or aromatic chlorinated hydrocarbons. Still other hydrocarbon derivatives such as those of bromine and iodine may be used but are usually more expensive and less desirable.

In the general case the liquids may have a boiling range from 65° to about 165° C., but for practical reasons which will be defined hereinafter, the ones which are most preferable will usually fall within a range of boiling point of about 100° C. to 125° C.

All of these liquids which form suitable azeotropic mixtures with acetic acid have also been found to form heterogeneous azeotropic mixtures with water. Thus, when distilled with pure water the boiling point is less than 100° C. and the condensate of the vapors separates into two layers. These entrainers are thus always substantially non-miscible with water.

Such a liquid which is added for the purpose of forming an azeotropic mixture with a substance is called an entrainer. These liquids are therefore classified as entrainers for acetic acid; and at the same time they are entrainers for water. (Every entrainer for acetic acid will also be an entrainer for water, although the reverse is not necessarily true; for example, ethyl acetate, methyl-ethyl ketone, propyl acetate, and many others which form azeotropic mixtures with water, but not with acetic acid.)

It has now been found possible to accomplish the economical separation and a concentration of acetic acid:
(a) from liquors resulting from wood distillation, after their neutralization with lime or other alkaline material;
(b) from liquors resulting from the chemical pulping of wood which may contain several hundred or more pounds of acetic and formic acids as salts for each ton of cellulose pulp produced; (c) from liquors resulting from a caustic fusion of woody material to give, among other things, alkali oxalates, acetates, and formates;
(d) from other alkaline liquors coming directly or indirectly from the treatment of cellulosic materials;
(e) from other industrial liquors containing sufficient salts of other acids dissolved therein to reduce the vapor pressure of water therefrom; (f) from aqueous solutions of acetic acid with little if any salts present, although in this case the degree of concentration of the acetic acid which is obtained may be somewhat lower.

These and similar liquors containing acetic acid as a salt are: (a) concentrated by evaporation if necessary (the most desirable final concentration is limited usually by the total solids content resulting in the liquor); (b) reacted with a carefully controlled amount of sulfuric or other strong acid which amount is sufficient just to release the acetic acid and the formic acid in the liquor without releasing other stronger acids or giving objectionable products due to other reactions; and then (c) distilled in the presence of an entrainer for the acetic acid, and some of the water, to give a two-phase condensate from the vapors of the distillation, the aqueous phase of which is more concentrated as to acetic acid than the liquor being distilled. The entrainer phase of the condensate is returned to the distillation to entrain more acetic acid. There is left behind in the distillation unit the liquor minus the acid and also minus some water. It has thus been found possible to obtain a substantial concentration of the acetic acid while at the same time removing it from the solids present in the liquor through the use of selected entrainers for the acetic acid.

While the concentration of acetic acid in the liquors, containing salts or other solids in solution, may be considered in various ways, it is intended herein to mean the ratio of acetic acid to water plus acetic acid in such solutions.

It may be possible, before freeing the acetic acid, to use, for the above-mentioned step for concentrating the residual liquors, some of the more modern methods of concentration of these liquors containing the acetate salt. There have been proposed various ways of concentrating the cooking liquors of the several different recovery processes. Such processes for example are: the Cedarquist Process, the Escher Wyss Process, the Rosenblatt Process, etc. Such methods of concentration of these solutions are not a part of this present invention, and these teachings are merely used in obtaining the resulting concentrated liquids.

Many liquids which come from the treatment of cellulosic materials may have the acetic acid in a free form as, for example, those from the destructive distillation of wood, the hydrolysis liquors coming from the Masonite process of treating wood material with high pressure steam, or from furfural or similar manufacture by acid treatment of cellulosic materials, etc. In these cases it may be desired to neutralize the liquors as has long been the practice with pyroligneous acid with a basic material such as lime. The concentration of the salt containing liquors by evaporation by any one of the known processes may then be accomplished. The acetic acid then may be liberated by adding an amount of sulfuric or other acid, which will just neutralize any excess of alkali and free the organic acid.

A flow sheet showing one embodiment of this invention as applied to the liquors from the neutral sulfite semi-chemical process for pulping wood is shown in the attached figure, with a diagrammatic indication of one preferred method of operating the distillation system which is the essential part of the process.

The block diagram indicates first a storage of black liquor from the blow tanks following the digestors of the pulping process which supplies the dilute neutral liquid (containing sodium acetate) to the evaporator station. Here the liquid is concentrated up to a strength as high as one part of solids per one-half part of water. This liquor passes to the acidifying station, wherein sulfuric acid is added to free the acetic acid and also to produce a chemical equivalent amount of sodium sulfate.

The acid-containing liquor is fed to a point near the top of a standard distilling column suitably designed to handle the suspension of solids which may be present, the liquid passes down the column due to gravity from plate to plate, and the action of the entraining agent distills all of the acetic acid, formic acid, and some of the water overhead. The concentrated liquor with the acetic acid removed is discharged at the base. The vapors overhead, actually a mixture of two azeotropic mixtures, (a) entrainer and water and (b) entrainer and acid, are condensed and the condensate is passed to a decanter. Two layers are formed because of the insolubility of the entrainer and water or aqueous acid. These are decanted, the entrainer layer containing only a small amount of acid and water is recycled through a valved line which controls the flow of entrainer so that some may be returned to a point near the bottom of the column while some may be returned to a point near the top of the column.

The solvent or entrainer layer passes to a point near the top of the solvent stripping column which is heated at its base with steam, the vapor containing the solvent and some acid and some water pass overhead to the same condenser, while the concentrated acetic acid and formic acid containing some water passes out of the bottom to further refining of standard type.

The determination of the amount of sulfuric acid or other acid used in the freeing of the acetic acid may be quite critical to differentiate between other acidic materials (either organic or inorganic) which may also be present as salts. The control may usually be determined most readily for the particular solution by the pH meter. Furthermore, the addition of sulfuric acid or other strong acid may tend to cause other reactions in these liquors, as indicated in U. S. Pat. 2,227,979, which allow the precipitation of impurities prior to the acetic acid removal. Such precipitation may assist the subsequent distilling operation, as these materials are often readily removed by settling, decantation, filtration, centrifuging, etc. before the actual distillation, which is thus accomplished with relatively cleaner liquors. Alternately, in some other cases, the use of an excess of the sulfuric acid or similar acid may cause a reaction giving an undesirable product or effect on the distillation or subsequent processing of the liquors.

Thus, an important and critical point of the successful operation of this invention, in its use as a step in the recovery of acetic acid from solutions where it is originally present as a salt, is the exact control of the pH of the liquor resulting by the treatment with sulfuric or other strong acid. Each different acidic material of the original solution will be liberated from its basic salt at a different value of the pH. Careful control at the exact point of stopping the addition of acid between a pH of 1.5 and 2.5 will usually free substantially the entire amount of acetic acid from its salt. A lower pH will free oxalic acid if such is present, for example, in the liquor obtained from a caustic fusion of wood.

Only in special cases, as for the obtaining of a separation from other acidic materials such as oxalic acid, or for precipitation of impurities, will the end point of the sulfuric acid addition be outside this optimum range, and then only narrowly, or only for a given time—with subsequent adjustment to the desired pH range by the addition of more sulfuric acid if the pH is too high, or addition of more liquor if it is too low.

Of even more importance is the control of the pH in the addition of sulfuric acid for the liberation of acetic acid from concentrated black liquors obtained in the pulping of wood, using sulfiite solutions. If a pH lower than just sufficient for the liberation of acetic acid is used, an undesirable liberation of sulfurous acid or sulfur dioxide may be produced with some liquors.

It is not usually desired to separate the acetic acid from the formic acid which often is present in smaller amount by exact control of the pH of the end point by the addition of sulfuric acid, but this separation may be effected, at least in part, because of the somewhat lower pH required for the liberation of formic acid from solutions of formates than for the liberation of acetic acid from acetates. In this case the acetic acid first liberated would be removed, then the formic acid would be liberated and removed.

In this specification and the claim, where acetic acid is referred to, it may contain also the formic acid which almost always accompanies it in more or less amounts from these processes involving treating of wood or other cellulosic products, as well as propionic acid and butyric acids which are often also present. The process described may be operated with mixtures of various amounts of these acids or with an acid uncontaminated with any of the others, or uncontaminated with salts or other materials other than water.

Also, where wood is mentioned, it may mean any other lignocellulosic, fibrous material in the original state or after chemical or other processing. Likewise, while the use of sulfuric acid is specified and is usually preferred, other volatile or non-volatile acids either organic or inorganic may be substituted which are more highly ionized or of higher acid strength than acetic acid. Examples are phosphoric, muriatic or hydrochloric acids, etc. Similarly, whereas sodium is usually referred to as the cation or base, as most common, this is only exemplary; and sodium sulfate is thus only exemplary of the reaction product of the typical acid with this typical, and more usual, base.

The concentration accomplished in the evaporation wherein the acetic acid is in the form of a salt may be to a range of about one part of total solids to ½ part of water by weight. While in some cases higher concentrations may be used, they will usually present difficulties in operation of the distillation step.

In considering the system acetic acid, water, and an entrainer for the acetic acid, it has been noted that there is a minimum constant boiling mixture between the acetic acid and the entrainer, and also a minimum heterogeneous constant boiling mixture between the water and the entrainer. There is no ternary constant boiling mixture, however, between all three components.

Hence, the separation which may be accomplished in the ordinary distillation column, tends to give the lower boiling minimum azeotrope at the top of the distilling column. In every case this will be the one of the water and the entraining liquid. There will also be more or less of the azeotropic mixture of acetic acid and the entraining liquid also present; and as will be seen, it is desirable for a large amount of this acetic acid-entrainer mixture to be present, since the function of the invention described is to bring the acetic acid over the top of the column by this entraining action.

Furthermore, there is another phenomena, which has been found to be quite important in this regard in the distillation of ternary systems of water, acetic, and entrainer. This depends on the fact that in the distillation of the ternary system, a heterogeneous condensate is obtained. Since the entrainer and the water are always substantially insoluble, one layer will contain substantially all of the entrainer; the other layer will contain substantially all of the water. The entrainers having been selected from the hydrocarbons, chlorinated hydrocarbons, etc., they are materials which have very low solubility for acetic acid in the presence of an aqueous layer. In other words, the partition coefficient is extremely low in terms of acetic acid concentration in the entrainer layer versus acetic acid concentration in the water layer.

This latter fact being true, by far the largest part of the acid which distills over will be found in the aqueous layer, which gives a substantial concentration therein, while the entrainer layer, which may be a very large amount relatively (particularly for low-boiling entrainers), will contain very little acetic acid. This entrainer layer may be returned to the distilling system to effect the given separation and concentration of additional liquors. The small amount of acid may be neglected in the examples.

While the relatively lower boiling hydrocarbons, i. e., those boiling in the range of benzene, etc., are not the best ones for this invention, still some of these properties may be shown very well by consideration of several such which boil in this low range. Thus it has been found that if a still is operated with aqueous solutions of acetic acid of various strengths, in the presence of an excess amount of entrainer, the vapors being condensed and the condensate separated into an aqueous and an entrainer layer, then the aqueous layer may actually have an acetic acid concentration higher than the charge to the still. The results of these experiments are given in Table I. A wide range of acid strengths were charged; and the range wherein there was a concentration in the aqueous condensate higher than in the still charge is indicated in the third column.

Table I

| Entrainer | B. P. | Range of Acetic Acid Strength in Still, where a higher strength is obtained in the aqueous layer of Condensate (percent) | Percentage Acetic Acid in Aqueous Layer of Condensate from an Aqueous Acid in the Still of 20% Strength, With Excess Entrainer | Percentage Acetic Acid in Aqueous Layer of Condensate from a Particular Distilling Column and 20% Acid in Pot with Excess Entrainer (percent) |
|---|---|---|---|---|
| No entrainer | | No such range | 15 | |
| Hexane | 68.8 | 0–74 | 59 | 34.3 |
| Petroleum Fraction | 78–80 | 0–78 | 65 | 50.0 |
| Benzene | 80.2 | 0–22 | 22 | 5.5 |
| Cyclohexane | 80.75 | 0–71 | 68 | 13.2 |
| Cyclohexene | 82.75 | 0–37 | 24 | 15.6 |

The next to the last column shows well that the use of these low boiling entrainers effects an immediate and very substantial increase in the concentration of the acetic acid over that in the aqueous phase of the still pot, which in each case was 20%. This compares with the experiment of the first line where no entrainer was used.

The last column above shows the effect of using a relatively inefficient distillation column to rectify the vapors from the pot. The percentage of acid in the entrainer layer is in every case actually decreased. This is contrary to usual expectation, and is due to the tendency, on rectification, for the entrainer-water azeotropic mixture to come over preferentially because of its lower boiling point compared to that of the entrainer-acetic azeotropic mixture. Thus no rectifying action of a distilling column would be desired (since the vapors from the aqueous solution itself in contact with the excess entrainer are seen to be stronger in acid concentration). On the other hand, the stripping action of a distillation column will be desirable to remove the last of the acetic acid in such a solution.

(There are no azeotropic mixtures of acetic acid with halogenated hydrocarbons in the boiling range of those indicated in Table I; and such are not found until the halogenated hydrocarbon has a boiling point of about 90° C or higher.)

The conditions with the high-boiling entrainers are comparable to those shown above in Table I with, however, the additional advantage of a lower amount of entrainer necessarily distilled.

There is indicated above and listed in the attached Table II, a large number of representative entrainers for the lower boiling and lower molecular weight aliphatic acids which have a greater or less utility in this invention. This list is by no means exhaustive and is to be regarded as representative only. Some of the pertinent properties in the present use are indicated in the several columns. Because of the many combinations of entrainers and acids or mixtures of acids, the discussion will largely be limited to acetic acid. Some variations result when other of the acids are present with acetic acid, or when present alone or in other mixtures, but the general method is the same. A careful choice of entrainers is necessary depending on the operating conditions and will be made from an analysis of the considerations given hereinafter.

It will be noted that the effect of the entrainer on the effective boiling point of the acetic acid (i. e. the azeotropic point) is to reduce this considerably below the normal boiling point of 118.5° C. of acetic acid. Similarly, the entrainer reduces the effective boiling point of water to that of its heterogeneous azeotropic mixture.

Many of the data of Table II of the boiling points have been taken from standard reference works; many others have been experimentally determined and the computations made for the purpose of this investigation, the object of which was to demonstrate practically from the binary systems the relative advantages of the preferred entrainers of this invention. Ternary data, even for only one acid, is too complicated for presentation and analysis.

Table II

FORMIC ACID (B. P. 100.75° C.) AZEOTROPIC RELATIONS WITH WATER AND WITH SELECTED ENTRAINERS

| Boiling Point of Water Azeo (° C.) | Composition Water Azeo (Percent Water) | Name of Compound | Normal Boiling Point (° C.) | Boiling Point Formic Azeo (° C.) | Composition Formic Azeo (Percent Formic) | Difference of B. P. Water (100°) and of Water Azeo Temp. | Difference of B. P. Formic (100.75°) and of Formic Azeo Temp. | Ratio Percent Formic/Percent Water in the Azeo Mixtures |
|---|---|---|---|---|---|---|---|---|
| 61.55 | 5.4 | Hexane | 68.95 | 60.6 | 28 | 38.45 | 40.15 | 5.19 |
| 69.25 | 8.83 | Benzene | 80.2 | 71.05 | 31 | 30.75 | 29.70 | 3.52 |
| 69.2 | 8.3 | Cyclohexane | 80.75 | 70.7 | 30 | 30.8 | 30.05 | 3.33 |
| 70.8 | 9.3 | Cyclohexene | 82.75 | 71.5 | 21 | 29.2 | 29.25 | 3.33 |
| 79.2 | 13.0 | n-Heptane | 98.45 | 78.2 | 56.5 | 21.8 | 22.55 | 2.10 |
| 80.0 | 15.8 | Methylcyclohexane | 101.1 | 80.2 | 46.5 | 20.0 | 20.55 | 4.35 |
| 84.0 | 15.9 | 2,5-dimethylexane | 109.4 | 83.2 | 48 | 16.0 | 17.55 | 2.94 |
| 84.1 | 13.5 | Toluene | 110.7 | 85.8 | 50 | 15.0 | 14.95 | 3.02 |
| 89.4 | 25.0 | Octane | 125.8 | 90.5 | 63 | 10.6 | 10.25 | 3.70 |
| 91.0 | 29.0 | Chlorobenzene | 131.75 | 93.7 | 59 | 9.0 | 7.05 | 2.52 |
| 92.0 | 33.3 | Ethylbenzene | 136.15 | 94.0 | 68 | 8.0 | 6.75 | 2.04 |
| 92.4 | 34.8 | p-Xylene | 138.4 | 95 | 70.0 | 7.6 | 5.75 | 2.04 |
| 92 | 35.8 | m-Xylene | 139 | 92.8 | 71.8 | 8.0 | 7.95 | 2.01 |
| 93.6 | 39.0 | o-Xylene | 143.6 | 95.5 | 74 | 6.4 | 5.25 | 2.01 |
| 95.8 | 48.0 | Propylbenzene | 159.3 | 98.8 | 93 | 4.2 | 1.95 | 1.90 |
| 96.4 | 48.2 | Camphene | 159.6 | Non-Azeo | | 4.0 | | 1.94 |
| 96.5 | 52.3 | Mesitylene | 164.6 | 99.7 | 96 | 3.5 | 1.05 | 1.84 |

Table II.—Continued

ACETIC ACID (B. P. 118.5° C.) AZEOTROPIC RELATIONS WITH WATER AND WITH SELECTED ENTRAINERS

| Boiling Point of Water Azeo (° C.) | Composition Water Azeo (Percent Water) | Name of Compound | Normal Boiling Point (° C.) | Boiling Point Acetic Azeo (° C.) | Composition Acetic Azeo (Percent Acetic) | Difference of B. P. Water (100°) and of Water Azeo Temp. | Difference of B. P. Acetic (118.5°) and of Acetic Azeo Temp. | Ratio Percent Acetic/ Percent Water in the Azeo Mixtures |
|---|---|---|---|---|---|---|---|---|
| 61.6 | 5.4 | n-Hexane | 68.8 | 67.5 | 5 | 38.4 | 51.0 | .93 |
| 69.25 | 8.9 | Benzene | 80.2 | 80.05 | 2 | 30.75 | 38.5 | .22 |
| 69.2 | 9.3 | Cyclohexane | 80.75 | 79.7 | 2 | 30.8 | 38.8 | .24 |
| 70.5 | 10 | Cyclohexene | 82.75 | 81.8 | 6.5 | 29.2 | 36.7 | .65 |
| 79.2 | 13.0 | n-Heptane | 98.4 | 95 | 17 | 20.8 | 23.5 | 1.3 |
| 84 | 15.9 | 2,5-Dimethylhexane | 109.2 | 100.0 | 35 | 16 | 18.5 | 2.2 |
| 84.1 | 13.5 | Toluene | 110.8 | 100.6 | 28.1 | 15.9 | 17.9 | 2.1 |
| 89.4 | 25.0 | n-Octane | 125.5 | 105.1 | 52.5 | 10.6 | 13.4 | 2.1 |
| 91.0 | 29.0 | Cholorobenzene | 131.8 | 114.7 | 58.5 | 9.0 | 3.8 | 2.0 |
| 92.0 | 33.3 | Ethyl benzene | 136.15 | 114.7 | 66 | 8 | 3.8 | 2.0 |
| 92.4 | 34.8 | p-Xylene | 138.4 | 115.3 | 72 | 7.6 | 3.2 | 2.1 |
| 92 | 35.8 | m-Xylene | 139.0 | 115.4 | 72.5 | 8.0 | 3.1 | 2.0 |
| 93.6 | 39.0 | o-Xylene | 143.6 | 116.0 | 76 | 6.4 | 2.5 | 1.95 |
| 95.2 | 41.25 | α-Pinene | 155.8 | 117.2 | 83 | 4.8 | 1.3 | 2.0 |
| 95.8 | 48.0 | Propyl benzene | 158.9 | Non-Azeo | | 4.2 | | |
| 96.4 | 48.2 | Camphene | 159.6 | 118.2 | 97 | 3.6 | .3 | 2.0 |
| 96.4 | 52.3 | Mesitylene | 164.6 | Non-Azeo | | 3.6 | | |
| 97.6 | 57.8 | Decane | 173.3 | Non-Azeo | | 2.4 | | |
| 97.6 | 60.4 | Cymene | 176.7 | Non-Azeo | | 2.4 | | |
| 99.3 | 84.8 | Naphthalene | 218 | Non-Azeo | | 0.7 | | |

PROPIONIC ACID (B. P. 140.9° C.) AZEOTROPIC RELATIONS WITH WATER AND WITH SELECTED ENTRAINERS

| Boiling Point of Water Azeo (°C.) | Composition Water Azeo (Percent Water) | Name of Compound | Normal Boiling Point (°C.) | Boiling Point Propionic Azeo (°C.) | Composition Propionic Azeo (Percent Propionic) | Difference of B. P. Water (100°) and of Water Azeo Temp. | Difference of B. P. Propionic (140.9°) and of Propionic Azeo Temp. | Ratio Percent Propionic/Percent Water in the Azeo Mixtures |
|---|---|---|---|---|---|---|---|---|
| 84.0 | 15.9 | 2,5-dimethylhexane | 109.4 | 108.0 | 8 | 16.0 | 32.9 | .503 |
| 84.1 | 13.5 | Toluene | 110.75 | 110.45 | 7 | 15.9 | 30.15 | .222 |
| 89.4 | 25.0 | Octane | 125.75 | 121.5 | 30 | 10.6 | 19.4 | 1.20 |
| 91.0 | 29.0 | Chlorobenzene | 132.0 | 128.9 | 18 | 9.0 | 12.0 | .621 |
| 92.0 | 33.3 | Ethylbenzene | 136.15 | 131.1 | 28 | 8.0 | 9.8 | .841 |
| 92.7 | 19.3 | Hydrocarbons | 138–140 | 134 | 67 | 7.3 | 6.9 | 3.47 |
| 92.4 | 34.8 | p-Xylene | 138.2 | 132.5 | 34 | 7.6 | 8.4 | .977 |
| 92 | 35.8 | m-Xylene | 139.0 | 132.65 | 35.5 | 8.0 | 8.25 | .992 |
| 93.6 | 39.0 | o-Xylene | 143.6 | 135.4 | 43 | 6.4 | 5.5 | 1.10 |
| 95.2 | 41.3 | α-Pinene | 155.8 | 136.4 | 58.5 | 4.8 | 3.5 | 1.42 |
| 95.8 | 48.0 | Propylbenzene | 158 | 139.5 | 75 | 4.2 | 1.4 | 1.56 |
| 96.4 | 48.2 | Camphene | 159.6 | 138 | 65 | 4.0 | 2.9 | 1.35 |
| 96.5 | 52.3 | Mesitylene | 164.0 | 139.3 | 77 | 3.5 | 1.6 | 1.47 |
| 97.6 | 57.8 | Decane | 173.0 | 140.5 | 95 | 2.4 | .4 | 1.65 |
| 97.6 | 60.4 | Cymene | 175.5 | Non Azeo | | 2.4 | | |

BUTYRIC ACID (B. P. 164.0° C.) AZEOTROPIC RELATIONS WITH WATER AND WITH SELECTED ENTRAINERS

| Boiling Point of Water Azeo (°C.) | Composition Water Azeo (Percent Water) | Name of Compound | Normal Boiling Point (°C.) | Boiling Point Butyric Azeo (°C.) | Composition Butyric Azeo (Percent Butyric) | Difference of B. P. Water (100°) and of Water Azeo Temp. | Difference of B. P. Butyric (164°) and of Butyric Azeo Temp. | Ratio Percent Butyric/Percent Water in the Azeo Mixtures |
|---|---|---|---|---|---|---|---|---|
| 89.4 | 25.0 | n-Octane | 125.75 | 124.5 | 15 | 10.6 | 39.5 | .60 |
| 92.0 | 33.3 | Ethyl benzene | 136.15 | 135.8 | 4 | 8.0 | 28.2 | 0.120 |
| 91.0 | 29.0 | Chlorobenzene | 132.0 | 131.75 | 2.8 | 9.0 | 32.25 | |
| 92.4 | 34.8 | p-Xylene | 138.45 | 137.8 | 5.5 | 7.6 | 26.2 | 0.158 |
| 92 | 35.8 | m-Xylene | 139.0 | 138.5 | 6 | 8.0 | 25.5 | 0.168 |
| 93.6 | 39.0 | o-Xylene | 144.3 | 143.0 | 10 | 6.4 | 21.0 | 0.256 |
| 95.2 | 41.3 | α-Pinene | 155.8 | 150.2 | 28 | 4.8 | 13.8 | 0.678 |
| 96.4 | 48.2 | Camphene | 159.6 | 152.3 | 2.8 | 4.0 | 11.7 | .058 |
| 96.5 | 52.3 | Mesitylene | 164.6 | 158.0 | 38 | 3.5 | 6.0 | .727 |
| 97.6 | 60.4 | Cymene | 176.7 | 161.0 | 60 | 2.4 | 3.0 | .993 |

There are several ways of correlating these data to enable the choice of the most effective entrainer. Thus, for increasing boiling points of entrainers, it will be noted that the boiling point of the water azeotropic mixture increases less rapidly than does that of acetic acid. Also, the reduction of the effective boiling point of acetic acid (difference of the boiling point and azeotropic boiling point) is greater than the corresponding reduction of the boiling point of water by the same entrainer, when this entrainer has a relatively low boiling point. Hence, it would appear that, since it is desired to remove the acetic acid in the vapors overhead, the lower boiling entrainers would be most desirable.

However, other aspects shown in Table II must be considered in this choice:

(1) The lower boiling entrainers have such a low amount of entrainer in both the water and the acetic azeotropes that a very large amount of entrainer would have to be distilled over to remove the acetic acid, and hence there would be a high heat cost and a high equipment cost, due to the large size of still required.

(2) There may be considered the boiling points of the individual binary azeotropic mixtures of any given entrainer with water and with acetic acid. Since the water one always has much the lower boiling point, it would appear that there is a tendency in any rectification to bring over the water one in preference to the acetic acid one, thus giving a vapor with less than the substantial amounts of acetic acid desired.

(3) On the other hand, it has been found that the reduction of the effective boiling point of the water and of the acetic acid by any given entrainer boiling in the range of about 120° to 125° C. is about the same (i. e. the difference between water boiling point and water azeotropic boiling point is about the same as the difference between the acetic acid boiling point and the acetic acid azeotropic point). However, with the entrainers of higher boiling points than about 125° C., the difference of the water boiling point and its azeotropic mixture is actually greater than the difference of the boiling point of acetic acid and its azeotropic mixture.

(4) Hence, it might be expected that an entrainer with a boiling point much above about 125° C. would be less desirable in accomplishing the concentration of the acetic acid coming over the top of the column in the vapor.

(5) A still further and important point is that the difference between the boiling point of acetic acid and that of the azeotropic mixture reduces rapidly for entrainers of increasing boiling point. At a boiling point of 155 to 170° C., depending on the particular series, there is no longer an azeotropic mixture, and no longer a reduction of the effective boiling point of the acetic acid.

Thus, it is not possible to remove the acetic acid in an azeotropic mixture with the higher boiling members of a series of halogenated hydrocarbons or of hydrocarbons themselves. Hence, in order to separate all of the acetic acid with these high boiling liquids, it is actually necessary to work between the boiling point of the acetic acid and that of the added liquid (by now above 160° C. approximately) and hence such higher boiling liquids are not useful for this process.

From the above considerations, it has been found that the desired boiling range of the entrainer for greatest benefits should be between about 100° and about 125° C., although in some cases it may be extended somewhat higher to 135° C. or even to 150° C., depending on the particular solutions being handled. The experimental studies confirmed these conclusions.

The above data of Table I and Table II have been determined without reference to salts or other materials present in the original aqeuous liquor to be concentrated. Thus, it has been shown to be possible to effect a concentration of acetic acid from its solutions with pure water merely by distilling in the presence of an appropriate entrainer and removing the aqueous layer of the condensate in a more concentrated form.

However, this process is even more effective in distilling the acetic acid away from water (the normal low boiler) in those cases where a salt is dissolved in the water. In such solutions of salts, particularly if having a high concentration of salt, the effective boiling point of the water is by itself increased, due to the elevation of boiling point caused by the solids in solution.

Thus, in many concentrated liquors resulting from lignocellulose processing or containing various salts dissolved therein, the elevation of boiling point of the water taken by itself may be as much as 5 or 10° C. This represents a 20 to 40% reduction of the vapor pressure of water at any given temperature, and hence a corresponding reduction in its tendency to be removed as vapor from a solution by heating, evaporation, distillation, etc.

At the same time, there is no corresponding reduction of the vapor pressure of the acetic acid by the salts or, if so, it is too small to be noticeable. There is no corresponding substantial affinity of acetic acid for the salts as shown by their relative insolubility in acetic acid; and, hence, there may be a slight concentrating effect possible merely by distilling some of the liquid away from the salts, with acetic acid coming over in slightly higher concentration. Therefore, the effective action of the entrainer is augmented, tremendously, and in an entirely unpredictable way by the presence of salts and other solids in solution to reduce the vapor pressure of water.

The entrainer is necessary, however, to effect the desired separation of substantially all of the acid; and preferably, of course, is the use of one which will remove a larger amount of acetic acid than water under the particular conditions and thus give an aqueous layer of the condensate of a higher acid concentration than the ratio in the liquor itself.

The thermodynamic understanding of the respective activities of acetic acid, water, entrainer, etc. under this particular condition with the solution of various salts becomes extremely complicated; but it has been found possible to take advantage in practice of these three actions together: ($a$) the elevation of boiling point, or reduction of partial pressure, of the water with substantially no reduction of the partial pressure of acetic acid; ($b$) the entraining action of the liquid selected particularly in relation to its preferential entraining action for acetic acid as compared to that for water; and ($c$) the decantation of the condensate layers to allow the separation of the entrainer which comes over in its two different azeotropic mixtures from the acetic acid and the water.

It is the combination of these effects which makes possible the operation described in the present invention as relating to salt solutions. (While formic acid complicates the scientific presentation, it has been found practically that in solutions where it exists to less than about 15% of the total acids present, it behaves substantially as does the acetic acid. The same is also true for propionic and butyric acids.)

It has also been found that any combination of liquids which gives the desired entraining action for the acetic acid and falls within the desired boiling range may be suitable. This may be an artificial combination of separate, pure liquids or, more usually, it may be a petroleum fraction such as a mixture of those hydrocarbons present in a low cut gasoline or very low cut naphtha range which would give an effective boiling range within that of the pure compounds indicated. Very low fractions, containing largely pentanes or very high naphtha fractions boiling above about 150° or possibly even 135° C., would not be most advantageous.

The high boiling naphtha fractions tend to remove all of the water at the same time as all of the acid from the original solution at a very high temperature, and leave an absolutely dry mixture of the solids. This would not effect the desired concentrating action and would give a mixture in the still of excess high boiling naphtha and solids, which would be difficult to handle.

It is necessary in the operation of this invention to use concentrations of liquids and selected entrainers which in the distillation system will still allow much of the water to pass through after removing all of the acid. This water then carries along the solids, if such are present, to further processing or to waste.

In the operation of this process, the normal distillation equipment may be used with a distilling column and reboiler, a condenser, and a separator for the two condensate phases. The distilling column is charged with the entrainer in an appropriate amount which will be different for each still, depending on the holdup capacity of the plates, number of plates, etc. The feed of the liquors should usually be near the top of the distilling column, since substantially a stripping rather than a rectifying operation is usually desired; and in fact as has been indicated above, actual rectification of the vapors above the feed plate may be a disadvantage due to the tendency to obtain as the low-boiling product at the head of the column the azeotrope of water and hydrocarbon which is least desirable there.

The vapors are condensed; and the condensate is separated into two layers. The water layer is removed as concentrated acetic acid which is substantially free of the solid impurities which were originally present in the liquors. One or two trays at the top of the distilling column may be operated "dry" (that is, without reflux) in order to minimize carry-over of fine droplets of the liquor itself. Alternately, any one of the other known means of removing such droplets, by means of wire mesh or other baffles, may be used.

As above mentioned, the entrainer layer of the condensate usually contains very little acetic acid, and it is now returned to the distilling column to entrain more acetic acid. A part of this may be returned to the top of the column. In the general case, it will be found that, contrary to usual operation of a distillation column, some part of this entrainer should be returned to a lower point of the system. It is not usually desirable to return all of it to a low point; and in the usual case it must not be returned to the very bottom of the distillation column; otherwise, some of the entrainer might run off with the liquors at the bottom of the column. (While this reference to a low point refers to the usual type of distillation column used for stripping, what is meant is that part of the distillation system where the acetic acid has been largely removed by the stripping action of the entrainer to bring it overhead.)

In the usual case, it is desired to withdraw the salt containing liquors, now stripped of acetic acid, from the base of the distillation column entirely free of entrainer in order to prevent loss thereof. On the other hand, because of the low cost of the entrainer, if it is a petroleum cut, for example, it may be more desirable to operate with a very slight loss of entrainer than with a slight loss of acetic acid which is comparatively valuable.

Having accomplished a substantial concentration of the acetic acid and, particularly, having removed it from the aqueous solution containing the salts and many other impurities associated with liquors resulting from treatment of wood or from other processing, the acetic acid in the water layer from the separator following the condensation of the entrain-distillation system may then be concentrated further if desired or necessary. A first step is the stripping of the small amount of entrainer which is dissolved in this aqueous phase. This is done in a usual distillation stripper, wherein the liquid is fed to the top of a stripping column; and the vapors going overhead carry off all of the solvent, some water, and a small amount of acetic acid. These vapors may well go to the same condenser which serves the original entraining distillation system; and the condensate is then added to the same separator.

From the base of this stripping column, the concentrated water and acetic acid mixture is discharged. It may then be concentrated by any one of several known means to the anhydrous condition if desired.

As indicated above, one of the important industries wherein this invention will be of advantage is in the production of pulp by chemical digestion of wood. The liquors from the several processes contain acetic acid and other low molecular weight homologous aliphatic acids as the salts. The recovery of these volatile acids also makes it easier to recover the other values, principally sodium sulfate for use in kraft pulping operations or otherwise. If a recovery furnace is used, the sodium salts of the acetic acid and the formic acid are normally burned to give soda ash. When working with liquors from the neutral sulfite process, this gives too high an alkalinity for the smelt to be reused in other pulping operations, such as in the kraft process.

Thus, by the use of this process with neutral sulfite liquors for the conversion of the sodium acetate and sodium formate to sodium sulfate in the recovery of the acids, the final smelt is largely sodium sulfate which may be used in other processes, including pulping by the kraft system, for which it was otherwise unfitted when mixed with a large amount of soda ash. (The kraft process is often called the sulfate process.)

In the recovery of acetic acid by this process from liquors of the kraft process itself, there is a large amount of free alkali to be neutralized before the acetic acid itself is freed by sulfuric acid. This produces a corresponding amount of sodium sulfate which may be more than can be reused in its entirety in the recycle. On the other hand, since the usual make-up of liquors from a kraft process requires the addition of fresh sodium sulfate and sulfate radical from sulfur burning, it follows that a substantial part of such sodium sulfate could be used. Hence, a part of the black liquors of a plant may be processed to free the acetic acid as described by the addition of sulfuric acid and the formation of sodium sulfate. This new sodium sulfate is thus the make-up for the balance of the liquors, which may be processed as before without recovery of the acetic acid and formic acid. The liquors from the recovery process for the volatile acids would be added to the other liquors before going to the drier and the furnace.

Thus, on using this invention with black liquor from kraft pulping, the adding of sulfuric acid for recovering acetic acid from a part of the liquors replaces the sulfur and sodium sulfate make-up, which will be used for the balance of the liquors. Also, if the sulfuric acid cost on a molecular basis were equivalent to the sulfur and sodium sulfate make-up normally used, it would not be an added cost in producing the amount of acetic acid recovered from the fractional amount of the total liquors treated since it would be the normal cost of makeup chemicals for pulping the wood. If greater, the difference would be the amount to be charged against the cost of recovery of the acetic acid.

The interrelation of the use of this invention to a combination of processing liquors from either the neutral sulfite or the sulfate process or both is thus possible with large commercial advantages. Furthermore, other methods of crystallizing out excess salts after evaporation to a high concentration before the acetic acid distillation may also be used as another step and added means of taking advantage of this invention on liquors which would thus contain correspondingly less of other constituents during the process for recovery of acetic acid.

As examples of the operation of this process there are given the following:

*Example I.*—Pyroligneous liquor containing 6% lower fatty acids, obtained from the destructive distillation of wood was neutralized with lime (CaO) to the end point indicated by the indicators naturally present in such liquors; next the methanol of the liquor was distilled off and then the solution was concentrated by conventional evaporation to a solution having by weight for each one part of water one part of the mixed calcium salts of the lower molecular weight aliphatic acids.

Muriatic acid was then added slowly to the hot solution in an amount just sufficient to liberate the acetic acid together with minor amounts of formic acid, propionic acid, and butyric acid, as was shown by a reading of 2.0 on a pH meter. Calcium chloride resulted from the double decomposition. Next the solution was fed continuously to a distilling system wherein there was present toluene as an entrainer to distill out the acetic acid and some of the water. The solution of the calcium chloride was discharged from the base of the distillation column substantially free of acetic acid.

The azeotropic mixtures of acetic acid and of the other lower aliphatic acids and toluene as well as the azeotropic mixture of water and toluene distilled over the top of the distillation column, was condensed, and separated into two layers. About one-quarter of the toluene layer, containing very little acids, was returned to the top of the distilling column and the other three-quarters was returned to a point near the bottom of the distilling column. The aqueous layer of the condensate was drawn off containing a concentrated solution of acetic acid and other aliphatic acids, having a strength of 75% expressed as acetic acid.

*Example II.*—Residual cooking liquor from the neutral sulfite semi-chemical process of pulping hardwoods was evaporated to obtain a solution having one part total solids dissolved in one part of water. Next, a concentrated solution of sulfuric acid was slowly added to this concentrated residual liquor in an amount just sufficient to free the acetic and formic acid present. This was added to a distilling pot. An equivalent amount of a low cut gasoline fraction boiling in the range of 110 to 115° C. was introduced into the pot. The hydrocarbon, volatile acids, and water distilled overhead; the vaporous mixture was condensed; the condensate was separated in two layers; the entrainer layer was returned to the still, and the water layer was withdrawn as a concentrated solution of the acetic acid and formic acid. The still residual liquors containing the sodium sulfate, sodium lignosulfonate, and other solids was dried, burned to recover the sodium sulfate for other uses and to supply heat to a boiler.

*Example III.*—The black liquor from a kraft pulping of resinous wood contained 1 part total solids to 6 parts water, of which solids about 40% are organic and 60% are inorganic in nature, was evaporated to a concentration of 1 part total solids to 1 part water. This concentrated liquor was divided into two parts. To one part, one-quarter of the total, sulfuric acid was added to neutralize the excess alkalinity and to liberate the acetic acid and formic acid. (Tall oil also was freed and was removed as a separate layer.)

These acidified liquors were distilled by feeding into the top of a column still in the presence of a low cut gasoline, boiling range 110–125° C. The distillate was decanted, the gasoline and the small amount of acid dissolved therein was returned partly to the top and partly to the bottom of the column, and the aqueous layer containing the volatile acids originally present as sodium salts was removed in a concentration of 60% and stripped in a second column still to remove the small amount of gasoline dissolved therein. The distilled 60% mixture of acetic acid and formic acid was diluted to 56% strength on an acetic acid basis for sale to the textile trade for use in souring operations.

The salt containing liquors were removed from the base of the distillation column exhausted of the volatile acids. These liquors, containing a very much larger amount of sodium sulfate and no sodium carbonate were added back to the untreated three-quarters part of the concentrated black liquor as a means of make-up of sodium sulfate. The combined liquor was evaporated, dried, and burned in the usual furnace to give a smelt immediately suitable for reuse in making liquors for a new digestor charge without addition of any new chemicals at this stage.

The make-up chemical for the kraft pulping process as a whole was thus seen to be sulfuric acid rather than sodium sulfate or sulfur.

*Example IV.*—The residual liquor employed in this example was obtained from the fusion reaction product of caustic soda and sawdust used to obtain oxalic acid.

The fused mass was dissolved in water and filtered to remove insoluble matter, commonly called "humus."

The aqueous solution was concentrated to 38° Baumé, whereupon concentrated sulfuric acid was slowly and carefully added in an amount sufficient to liberate the acetic and formic acid from its alkali salt but not to liberate oxalic acid. In other words, the oxalate ion remained in the liquor solution as an alkali metal salt.

The acidified solution was then fed near the top of a continuous distilling column in which monochlorobenzene was boiling. The vapors overhead contained chlorobenzene, acetic acid, and water. They were condensed and separated into two layers. The water layer was discharged containing substantially all of the acetic acid in a concentrated form; and a part of the chlorobenzene layer was refluxed to a low point of the distilling column with a part going to the top plate of this column. There was discharged from the bottom of the distilling system the liquors freed of acetic acid and containing sodium oxalate, sodium sulfate, and other solids.

It is obvious from these examples and the many others which may be cited, as indicative of the scope of this invention, that any standard type of distillation process or equipment may be used which is known to the art and which is suitable for working with such solutions. The usual problems of corrosion, etc., which are met with in dealing with solutions of these materials will be overcome by methods familiar in the art. The use of any standard equipment and usual processing techniques for preparing the concentrated aqueous solutions are within the scope of this invention, also the usual methods of making anhydrous acid from the concentrated solutions resulting from this processing.

Furthermore, it is noted that the boiling temperatures noted herein have always referred to those at atmospheric pressure and are the so-called normal boiling points. However, the same entrainers may also be used even more advantageously to effect the desired separating and concentrating action for acetic acid from liquors of the type described, at either higher or lower distilling pressures than atmospheric pressure, since some of these entrainers have a better separating action or a better concentrating action for particular liquors when boiling with them in the manner described at a sub-atmospheric or a super-atmospheric pressure. Such modifications of the operating temperatures and pressures with these entrainers may take advantage of specific properties and conditions of individual solutions and entrainers.

Also, it is noted that specific ones of the entrainers described for the lower aliphatic acids (formic, acetic, propionic, butyric) will be more advantageous than others, depending on the particular acid which is present or which predominates in the solution. Usually the boiling range of the most advantageous entrainer will vary depending on the lower fatty acid which is present, or which predominates in the aqueous solution.

Also, the term "salts" is frequently used in these specifications and the claims to mean all of the solids present in the liquors containing also acetic acid. These solids, for the purpose of this invention, are regarded as more or less inert, except that they reduce the vapor pressure of water, while not reducing that of acetic acid to any important amount. This term, "salts," hence means any such dissolved substance, and might include salts of organic or inorganic acids, complex salts such as sodium lignosulfonates, non-volatile acids themselves, sugars, and any other organic or inorganic materials in solution.

Having now described the invention, what is desired to be claimed is:

The process of recovering a concentrated aqueous solution of low molecular weight fatty acids from black liquor from the sulfate process of preparing wood pulp comprising evaporating said black liquor to a concentrated black liquor; acidifying with sulfuric acid said concentrated black liquor to a pH of between 1.5 and 2.5; adding to said acid treated and concentrated black liquor an entrainer selected from the group consisting of hydrocarbons and halogenated hydrocarbons having a boiling point of between 65° C. to 165° C. and adapted to form an azeotropic mixture with said acids and also with water; distilling overhead simultaneously said two azeotropic mixtures formed from said acid treated and concentrated black liquors; condensing simultaneously said distilled azeotropic mixtures to form a condensate of two layers, one of which contains the entrainer layer and the other of which is a concentrated aqueous solution of said low molecular weight acids; and separating said concentrated aqueous acid solution from said entrainer containing layer, thereby producing a fatty acid-depleted concentrated black liquor suitable for re-use as a cooking liquor and concentrated aqueous distillate solution containing said low molecular weight fatty acids.

References Cited in the file of this patent

UNITED STATES PATENTS

| | | |
|---|---|---|
| 1,952,845 | Dreyfus | Mar. 27, 1934 |
| 2,184,563 | Othmer | Dec. 26, 1939 |
| 2,227,979 | Othmer | Jan. 7, 1941 |
| 2,395,010 | Othmer | Feb. 19, 1946 |
| 2,714,118 | Copenhaver et al. | July 26, 1955 |